Figure 6A:
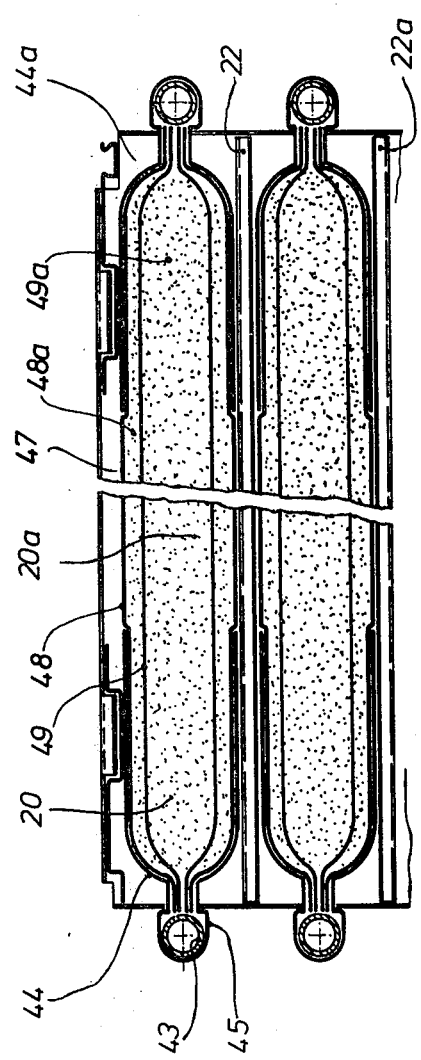

United States Patent [19]

Laing et al.

[11] 4,170,261

[45] Oct. 9, 1979

[54] HEAT STORAGE DEVICE

[76] Inventors: Nikolaus Laing; Ingeborg Laing; Oliver Laing, all of Hofener Weg 35-37, D 7148 Remseck 2 near Stuttgart, Fed. Rep. of Germany

[21] Appl. No.: 832,648

[22] Filed: Sep. 12, 1977

[30] Foreign Application Priority Data

Sep. 24, 1976 [AT] Austria .............................. 7093/76

[51] Int. Cl.² .............................................. F28D 13/00
[52] U.S. Cl. ................................ 165/104 S; 126/400; 126/419; 126/436; 126/429; 126/430; 237/1 A
[58] Field of Search ................. 165/104 R, 104 S, 172; 126/270, 400; 237/1 A

[56] References Cited

U.S. PATENT DOCUMENTS

| | | | |
|---|---|---|---|
| 2,936,741 | 5/1960 | Telkes | 165/104 S UX |
| 3,299,945 | 1/1967 | Rice et al. | 165/104 S X |
| 3,743,782 | 7/1973 | Laing | 165/104 S X |
| 3,786,232 | 1/1974 | Laing | 165/104 S X |

*Primary Examiner*—Edgar W. Geoghegan

*Attorney, Agent, or Firm*—Pennie & Edmonds

[57] ABSTRACT

In a heat storage device for low-temperature applications, e.g. for heating greenhouses and warehouses, the drop in temperature in an intermediate heat carrier circuit, which had previously been necessary in such applications, is avoided and a said device of simpler construction than devices previously used for such applications is provided in the form of a plurality of heat storage members, each charged with a meltable heat storage mass and each having ribs, the members being stacked to define a battery thereof and being so arranged that they form between them ducts for the passage therethrough of a current of air, and ribs on said members defining ribs of a heat exchanger. The device may be used in combination with a heat pump. The invention also includes a method of space heating a building by solar energy, a method of cooling an enclosed space and a method of maintaining the ambient air temperature of an enclosed space constant, all by means of a said device.

16 Claims, 21 Drawing Figures

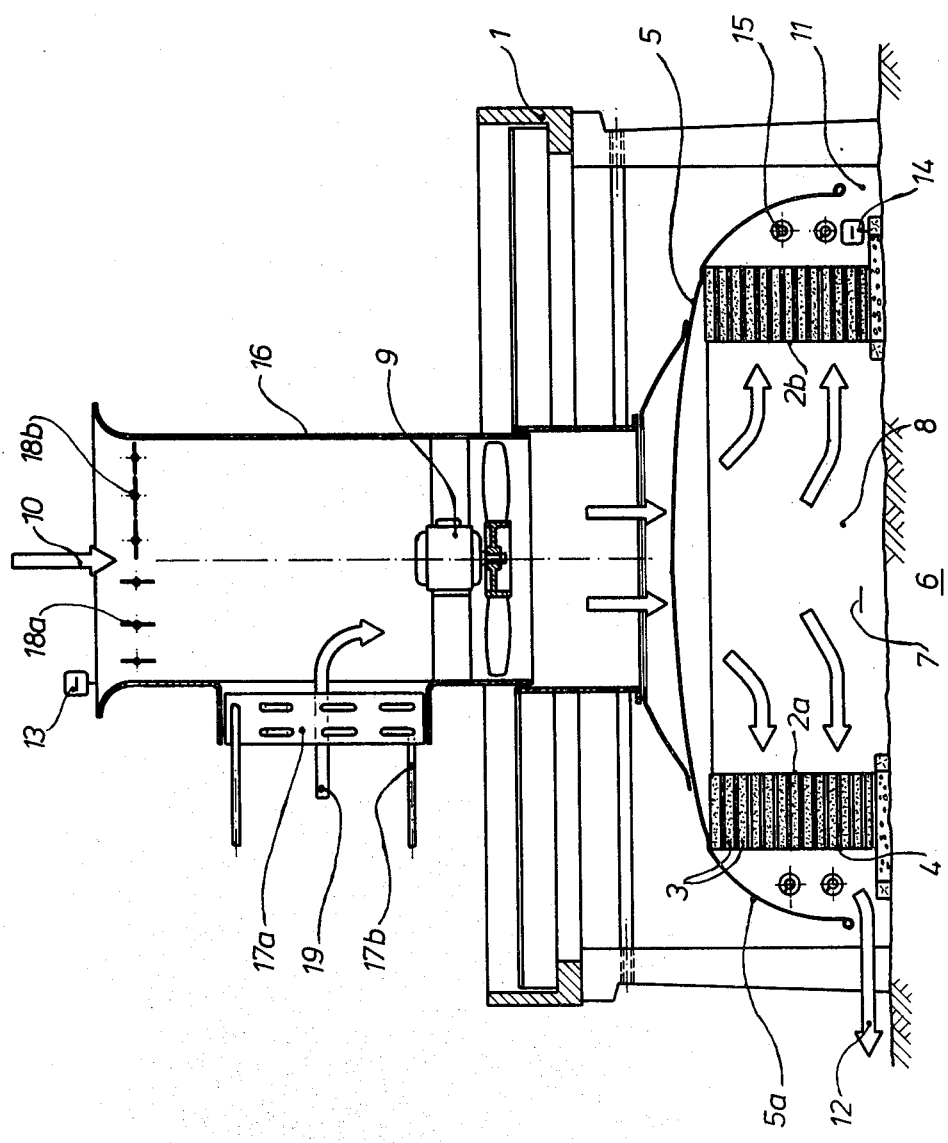

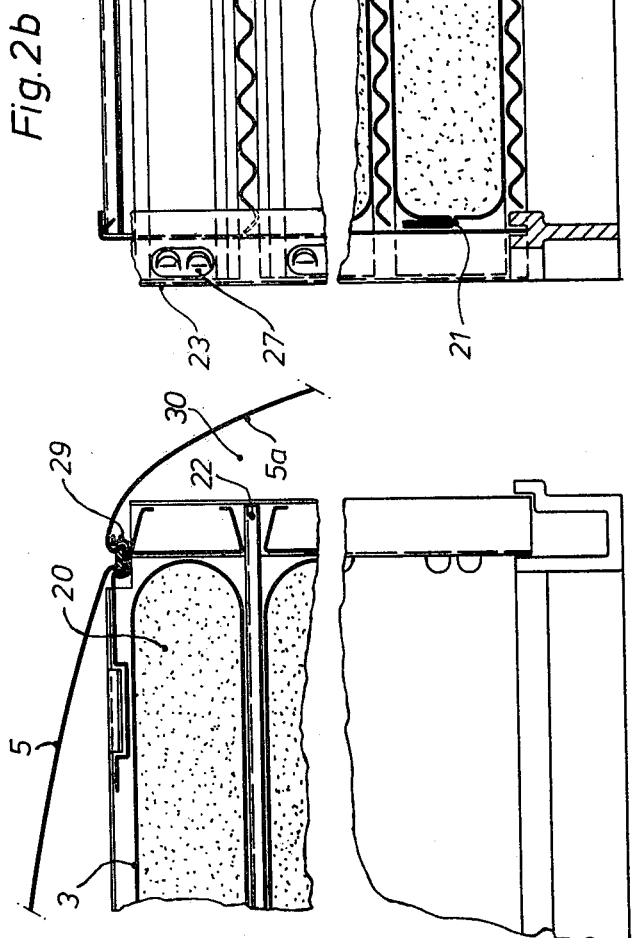
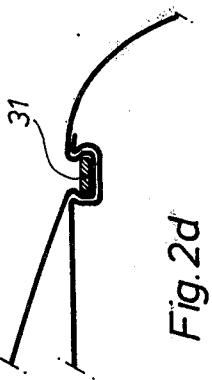
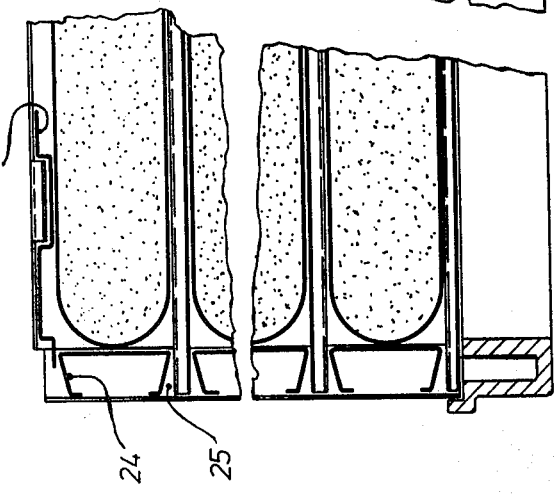
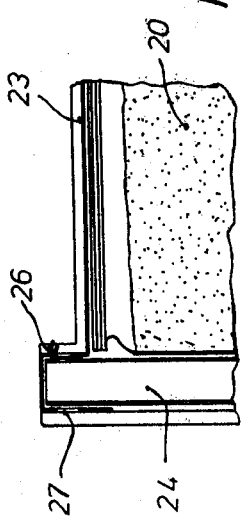

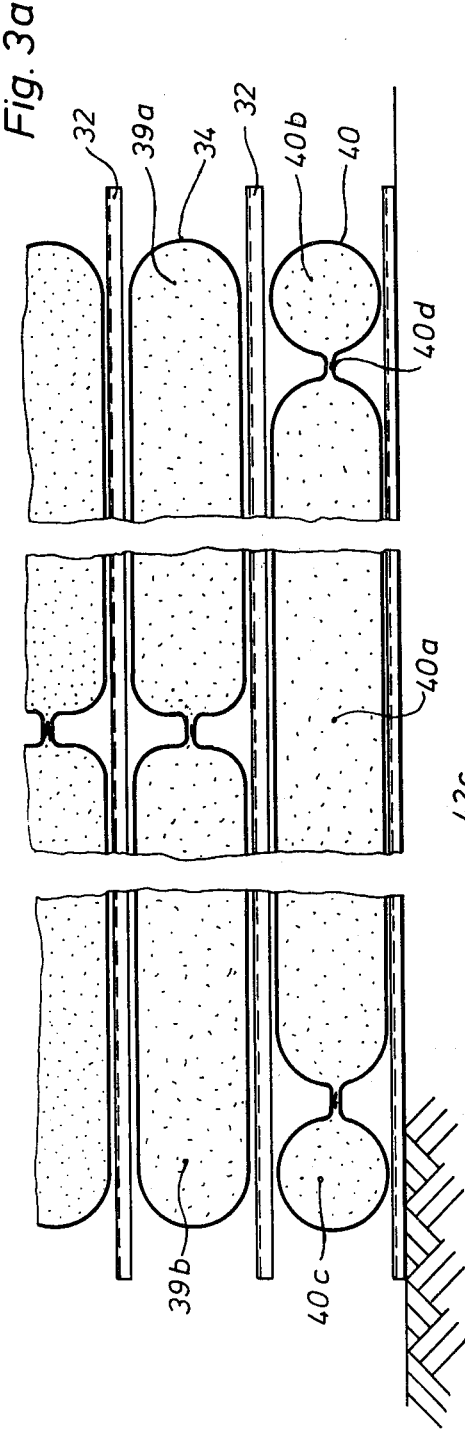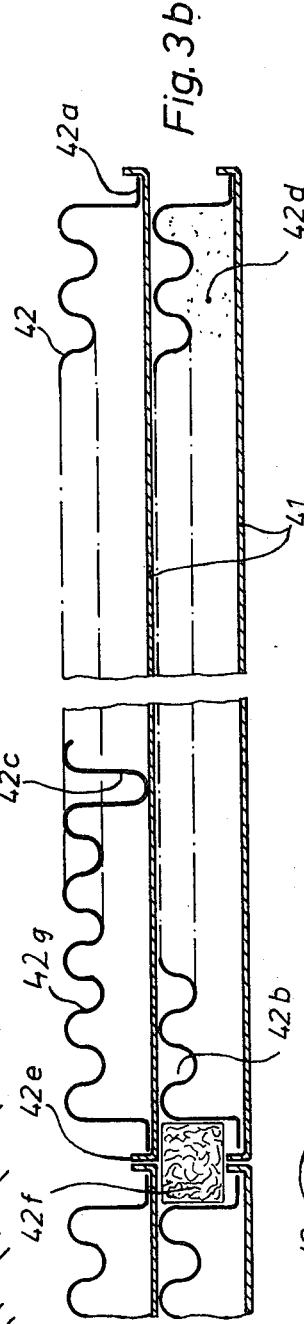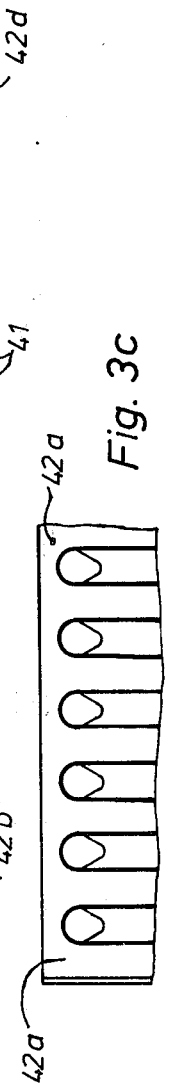

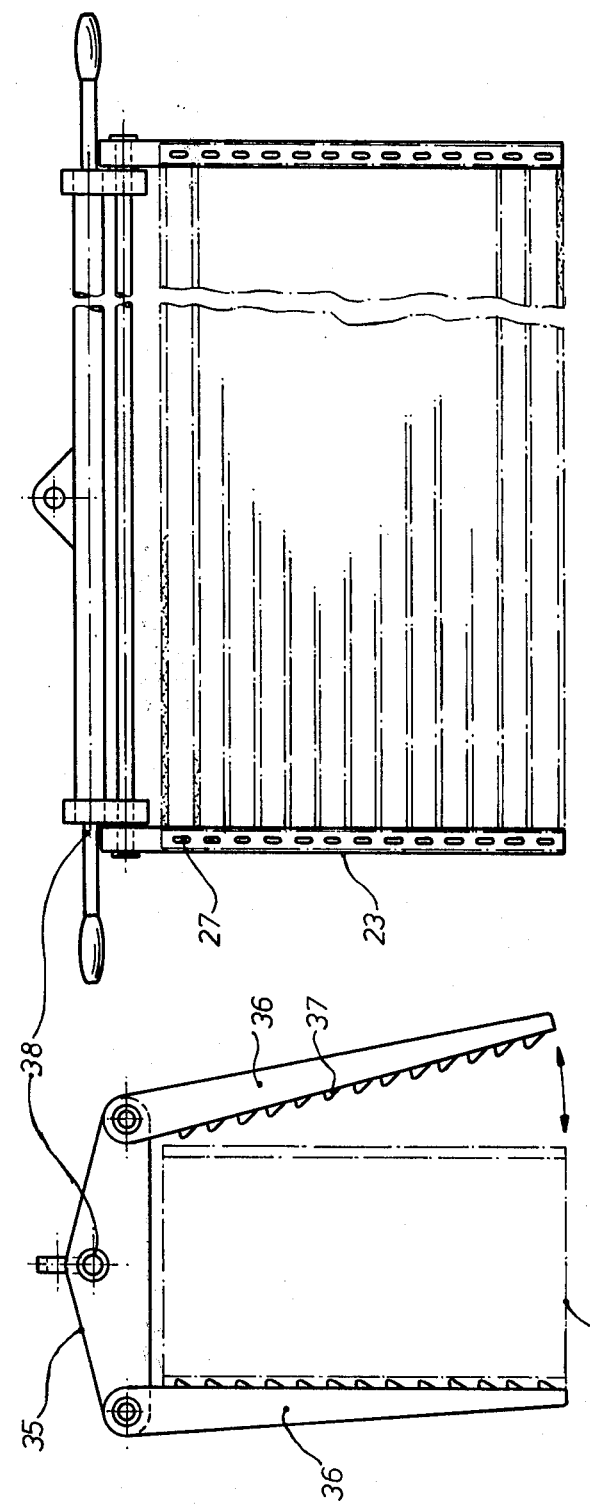

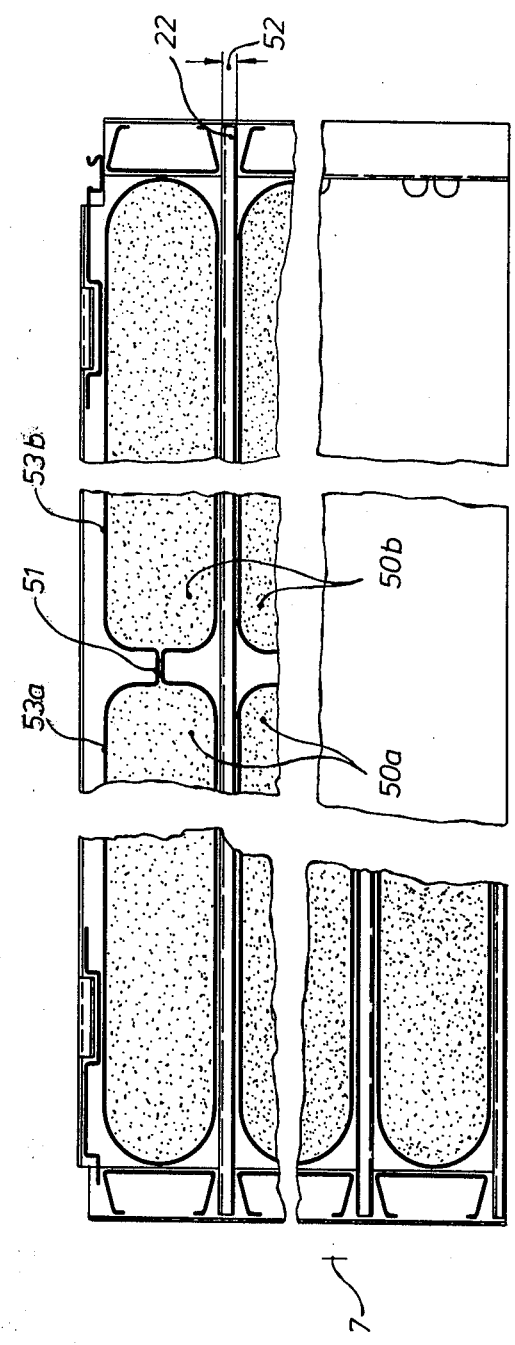

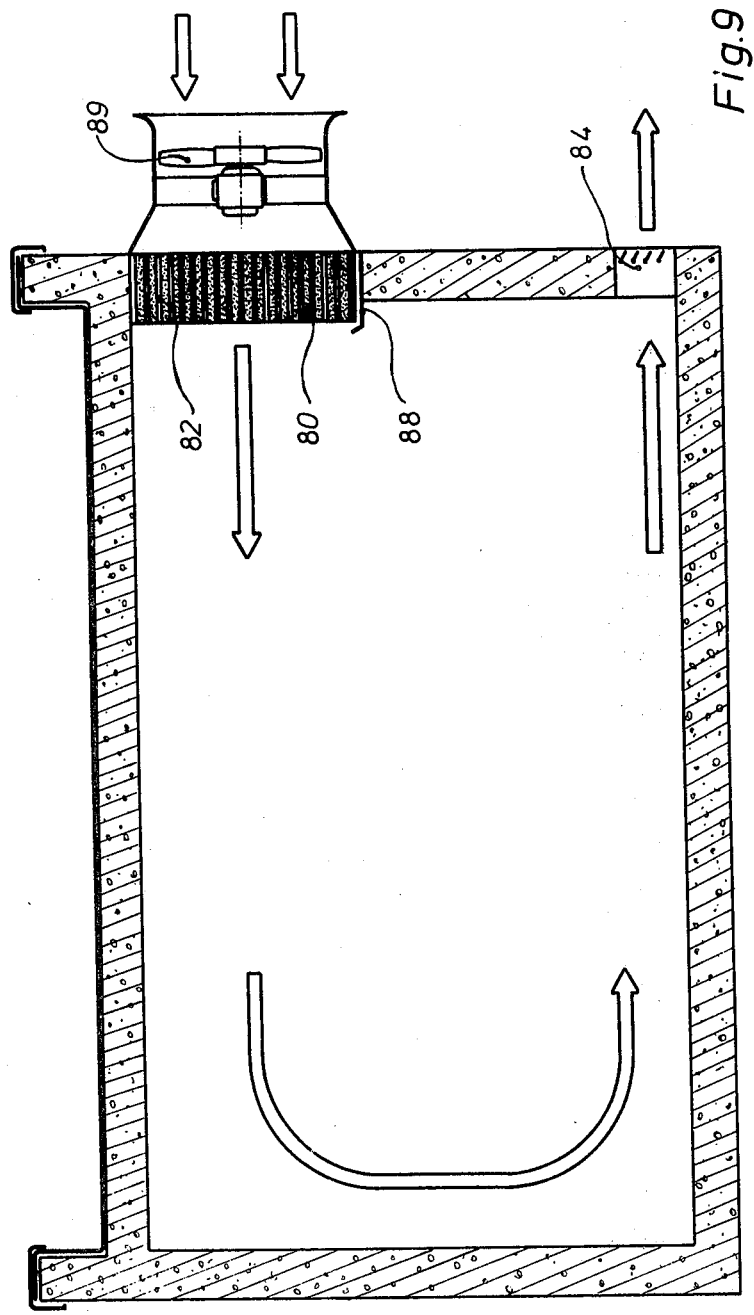

HEAT STORAGE DEVICE

It is known to use meltable storage masses as heat storage means in containers, through which a flowable heat carrier flows for supplying and removing the heat. In all the known cases the storage masses were disposed in containers, which do not suffer any deformation under the hydrostatic pressure of the storage mass. This, in the past, entailed either an arrangement involving containers with walls of adequate resistance to bending or accommodation in cylindrical vessels of circular cross-section, in which, under the influence of the hydrostatic forces, the wall takes up a cylindrical shape of annular cross-section. In every case it was possible to insert the heat storage mass in its liquid state only by the use of a relatively large amount of material for the container and a relatively elaborate suspension, so that the economic application was out of the question in cases where large quantities of heat had to be stored at a low temperature differential.

The invention relates to storage devices using storage masses which are meltable at the working temperature, particularly for space air conditioning, which are meant to withdraw heat from, or impose heat on, a current of air at a low temperature differential.

Storage devices using a meltable storage mass, so called latent heat storage devices, have the theoretical advantage over other heat storage devices of the quality of the heat not being impaired by its storage, i.e. that, when discharging, heat is liberated at approximately the same temperature as that at which it was admitted to the storage device during the charging period.

In practice this advantage is again lost to a large extent by the fact that a liquid heat carrier is interposed between the latent heat storage device and the air current, which is in heat exchanging relationship with the latent heat storage mass via a first heat exchanger and in heat exchanging relationship with the air current via a second heat exchanger which as a rule is equipped with laminae of large surface area, whereby the step in the temperature takes place in the transmission of the heat from the storage device to the heat carrier as well as from the heat carrier to the air current, viz. during charging as well as during discharging. As a result appreciable temperature differentials are, in practice, created during the operation of the latent heat storage device, between charging and discharging, so that in many cases a water storage device which is heated moderately behaved more satisfactorily, since in that case the storage medium is at the same time the heat carrier medium. For this reason latent heat storage devices have not been adopted for such applications where only small temperature differentials are permissible between charging and discharging.

The invention describes latent heat storage devices which do not have this disadvantage. According to the invention the laminae of the heat exchanger on the air side are constructed in the form of hollow laminae and filled with the latent heat storage mass. Thereby the drop in temperature in the intermediate heat carrier circuit, which has become necessary in low-temperature applications, is avoided. At the same time storage devices according to the invention are of simpler construction than known latent heat storage devices.

The heat exchanger storage elements embodying the invention are versatile in practice. They should achieve particular significance as temperature-integrated daytime storage devices.

The storage vessels of the storage devices embodying the invention preferably consist of parallelepiped-shaped containers which extend over a small distance perpendicular to the air duct and which form between them slot-shaped ducts. These containers may for example be in the form of tubular thin-walled hose-like elements having a side wall comprising a foil material, closed at both ends, but they may also intercommunicate. In order to avoid segregation, the contents may circulate in the molten state. Alternatively, however, storage mass which has been disolved in solvents may be caused to flow therethrough.

The invention will now be described with reference to exemplary embodiments of the invention.

FIG. 1 shows a cross-section through a temperature integrator for greenhouses with storage vessels embodying the invention. Below the cultivation table 1 two storage batteries 2a and 2b are provided storage member 3 consisting of a tubular hose-like element having a thin bendable side wall comprising a foil material. These tubular elements are hollow ribs 3 which form ducts 4 between them. Perpendicular to the plane of the paper the length can be as long as the length of the cultivating tables 1. At the top the storage battaries are covered by a foil 5 and 5a which, together with the storage batteries 2a and 2b and the greenhouse floor 6, bounds an air duct 7, which is also bounded at its end by the foil 8. Spaced apart by several meters, fans 9 are provided which force air from the interior of the greenhouse in the direction of the arrows 10 through the storage batteries 2a and 2b, so that air is discharged from the slits 11 in the direction of the arrow 12. In accordance with the invention, a temperature sensor 13 switches the fan 9 on, when the air temperature in the greenhouse, due to solar radiation thereinto, exceeds a predetermined value. The latent heat storage mass disposed in the storage containers 3 has a melting point which is at a temperature which lies below this threshold value and above the lowest permissible ambient temperature.

As soon as the temperature sensor 14 indicates the same temperature as the temperature sensor 13, the fan 9 is switched off, since the storage batteries 2a and 2b are then charged.

As soon as the ambient temperature falls to the lowest permissible temperature, the fan 9 is again switched on, and is again not switched off until the temperature differential between the temperatures at the temperature sensors 13 and 14 has become zero, whereby the complete discharge is indicated. Downstream of the storage devices in the direction of flow therethrough banks of heaters 15 are provided through which a heat carrier of a heating installation flows. As a result of this provision, the ambient air is first subjected to the excess heat which has been stored during the radiation thereinto, and only then is it subjected to heat from the heating installation, if this is still required.

If the storage batteries 2a and 2b are expected to acquire not only the excess ambient heat, but additionally the heat of a heat pump installation, a ribbed heat exchanger 17a, through which the pipes 17b pass, is provided on the side of the inlet pipe 16. There are moreover provided pivotable flaps which, as shown at 18a are in the open position and as shown at 18b in the closed position. If the flaps are closed as shown at 18b ambient surrounding air is admitted in the direction of the arrow 19 through the heat exchanger 17a, the air being heated in the latter and subsequently charging the storage batteries 2a and 2b.

FIG. 2a shows, to a larger scale, a cross-section through one of the storage batteries 2. The storage mass 20 is introduced into the each of which comprises a plurality of heat storage members or as shown in longitudinal section in FIG. 2b, sealed by welding at their ends 21. For the purpose of spacing two adjacent tubular elements, corrugated sheet metal inserts 22 are provided, which moreover act as indirect heat exchanger ribs. At both axial ends of a module of a storage battery 2a and 2b, end discs 23 are provided which are shown in the plan view of FIG. 2c. Between two mutually facing terminal sheet metal elements 23, profiled strips or bridges 24 are provided which, together with the corrugated sheet metal ducts 22, form conical inlet apertures 25.

These profiled strips 24 are unseverably joined to the end discs 23 by means of straps 26. The end discs have a plurality of perforations 27 which serve for supporting the storage module. A lid 28 has a profiled groove 29, into which the foil 5 is inserted and to which it is secured, the latter also covering the manifold 30 in the region 5a, in which the heater bank 15 is disposed.

FIG. 2d shows to a larger scale the form of closure using a closure rod 31.

FIG. 3a shows a construction of a storage battery embodying the invention, in which storage members are located between corrugated strips 32, arranged in layers and constructed at a foil 34. The storage member consists of two equal regions 39a and 39b. This ensures that the corrugated strips 32 remain horizontal. An alternative construction is that of the storage member 40 whose central region 40a is separated from two hose-shaped regions 40b and 40c by means of welded boundaries 40d. This construction results in a positional stability which is even greater to an appreciable extent, since the cylindrical regions 40b and 40c cannot be squashed together.

FIG. 3b shows a different construction of the storage battery 2. On flat sheets, e.g. of aluminium 41, a deeply drawn foil 42 is welded up along the seam 42a. The troughs 42b form air ducts and the top of the troughs form a spacing means for vertically spacing portions of the containers formed in part by the sheets 41. After every fifth trough, a trough 42c is of such depth that it can be welded or secured by adhesive to the flat plane 41. The storage mass is disposed in the spaces 42d.

In order to prevent longitudinal displacement, the ends 42e are bent upwardly. The space 42f which is formed between two adjacent plates is filled by a plastic foam strip.

FIG. 4a shows a plan view and, FIG. 4b the side view of the end disc 23 of a storage module with a supporting device 35. The supporting arms 36 have a plurality of teeth 37, which engage in the perforations 27 of the end discs 23. In this way the forces are introduced over a plurality of locations, so that extremely light designs, preferably of aluminum sheet can be employed. The unit is then supported by the supporting rod 38. In accordance with the invention it is a requirement that for transportation for the storage mass 20 be frozen solid, so that the storage members 3 have adequate resistance to bending.

FIG. 5 shows an alternative form of construction, in which the tubular elements 53a is subdivided into two parallel ducts by means of a heat sensitive adhesive or by welding. A storage mass 50a having a melting point of, for example, 18° C., faces the air duct 7, whist a storage mass 50b whose temperature of crystallisation is, for example, 20° C., is enclosed in the tubular elements 53b. By reason of this sub division, the temperature differential between the air conducted therethrough and the storage mass concerned is even smaller during discharging. The width of a storage battery in the direction of flow is only approximately 200 mm in the embodiment according to FIG. 1 and FIG. 4, since with this width in combination with a duct height 52, which is determined by the corrugated sheet metal insert 22, a favourable relationship between temperature differential between the air and the storage mass on the one hand and the power for conveying the air required of the fan 9, results.

FIG. 6a shows a modified construction of the latent heat storage device according to FIG. 2a, in which the place of the profiled strips 24 is taken by the sheet metal sections 44 which have a pocket 45, into which pipes 43 are inserted. These pipes 43 form the heat exchanger of a heat pump (not shown) so that the storage mass 20 is able not only to give off heat to, or withdraw heat from, the air current, which is conducted through the air ducts between two chargeable storage members formed by the sheet metal insert 22, but also able to be charged by the condenser of a heat pump or discharged by the evaporator of a heat pump. Alternatively a flowable heat carrier of a heating installation can be conducted through the pipes 43, so that the storage members 3, in combination with the sheet metal sections 44 and 44a and the corrugated sheet metal inserts 22, simultaneously form the heat exchanger ribs of the heating installation.

Figure 6B:
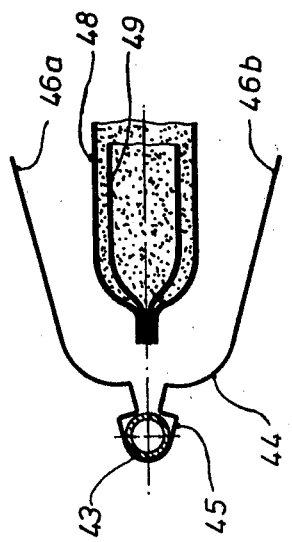

FIG. 6b shows the sheet metal section 44 in its condition prior to assembly. The pipe 43 is merely slid into the pocket 45. Only upon assembly are the limbs 46a and 46b pressed together, whereby the tube 43 is enclosed in tight contiguous juxtaposition and hence with good thermal contact. As in the case of the corrugated sheet metal inserts, here also thin-walled aluminium sheet is used in the manufacture of the sheet metal section 44 on account of its good thermal conductivity. The heat contact with respect to the central region 20a of the heat storage mass is provided via the sheet metal inserts 22 and 22a. The storage members 47 consist of an outer foil 48 and an inner foil 49. In the spaces 48a a storage mass is introduced, whose temperature of crystallisation is below the highest daytime temperature. The latter serves for admitting the excess heat which has been radiated into it. The foil 49 envelops the storage mass 49a, which admits the heat from the heat pump and whose temperature of crystallisation is above the highest daytime temperature.

Figure 7A:
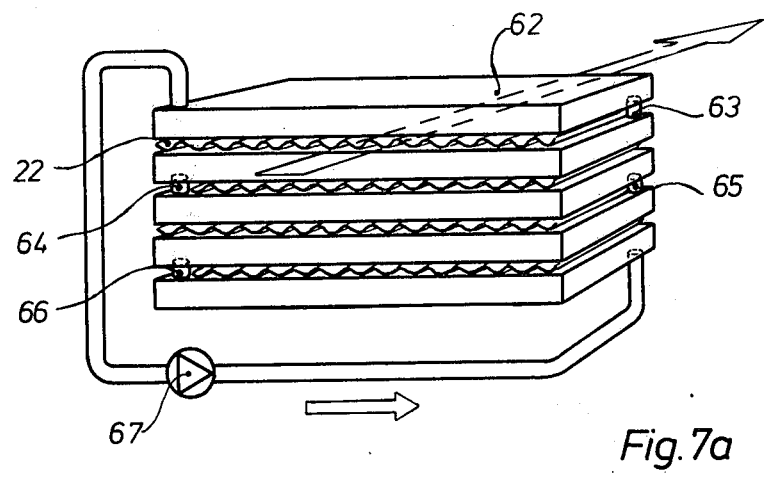

FIG. 7a is a perspective, diagrammatic representation of the module of a storage battery with the corrugated sheet metal inserts 22 and the storage members 62, which are interconnected by diagonally disposed conduits 63, 64, 65, 66. By means of a pump 67, shown symbolically, the melt is circulated in its charged condition. Thereby segregation of the seed crystals in the storage mass is prevented.

Figure 7B:
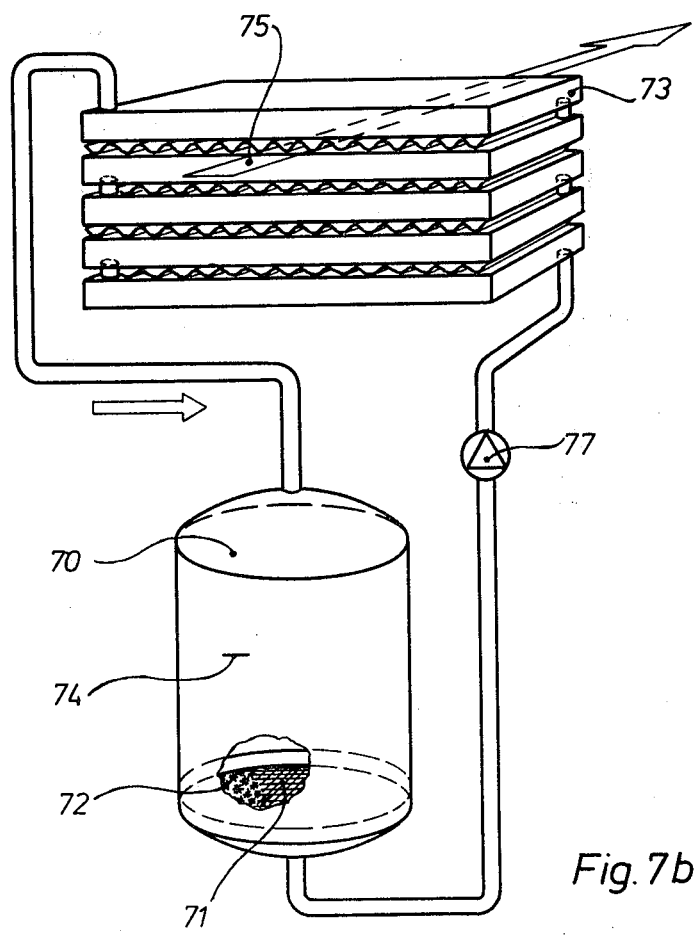

FIG. 7b shows the same storage device as in FIG. 7a, which, however, communicates with a storage tank 70. In this storage tank a filter bottom 71 is provided having a crystalline storage mass 72 thereon, whilst a storage mass 74, disolved in a solvent, is disposed thereabove.

By means of the pump 77, concentrated storage mass solution is conducted through the laminar storage vessels 73. If heat is withdrawn from the storage laminae 73 by the air current 75, the solubility of the storage mass in the liquid is reduced, so that crystals of storage mass are formed which remain in the storage laminae. In order to prevent the internal space of the storage laminae from growing, the interior of the latter should obtain a loose fleece, accretion of the crystals thereto taking place.

As soon as the air current 75 supplies heat to the storage device, the solubility of the storage mass in the solvent again increases, so that the crystals again go into solution. Crystals which have been dragged along by the liquid stream collect in the region 72 and are dissolved as soon as all the crystals disposed in the storage laminae are dissolved and the temperature of the liquid increases further.

Figure 8:
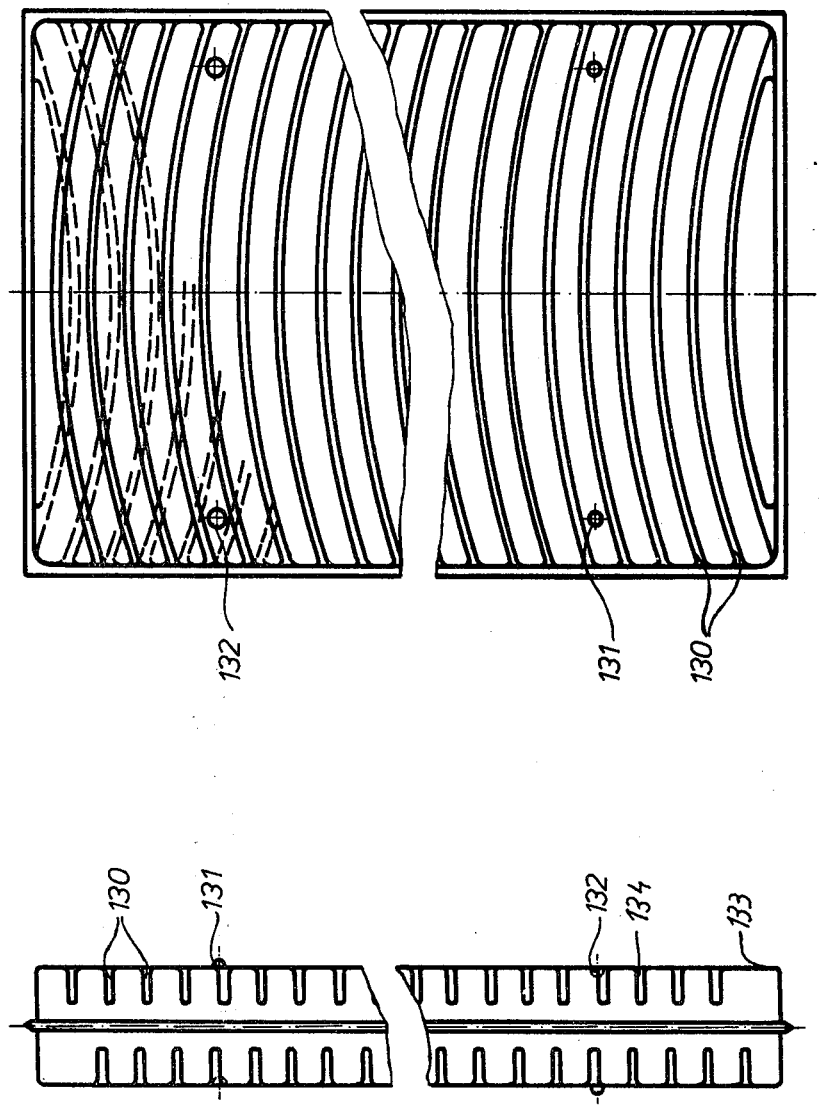

FIG. 8 shows a side view and plan view of a modified form of the storage vessel 3, from which the storage batteries are derived. Into the upper and lower side of the storage mass envelope a plurality of air ducts 130 are impressed, which extend along a circular path in order to prevent slippage of one within the other during stacking. The raised portions 131 and the recesses 132 provide centring during stacking. In this storage vessel the aluminium sheet construction can be dispensed with. Thereby self-supporting storage batteries of the desired size, which also again can be transported only in the frozen condition, can be assembled by stacking.

FIG. 9 shows diagrammatically a warehouse, whose interior is ventilated. By means of the fan 89 ambient outside air is forced through the storage battery 82, which may extend over the entire length of the building. This air throughput is discharged through the aperture 84. During the day the storage mass 80 is charged, whereby the incoming outside ambient air is cooled. When the temperature drops below the dew point, water condensate is liberated, which is caught by the pan 88 and conducted away. During the following night the incoming night air is heated, so that approximately the same temperature prevails by day and by night. The storage devices 82 preferably have two or more storage masses and are sub-divided in the manner shown in FIG. 5, so that, depending on the outside ambient temperature during the night, at least one of the storage masses is discharged.

Figure 10A:
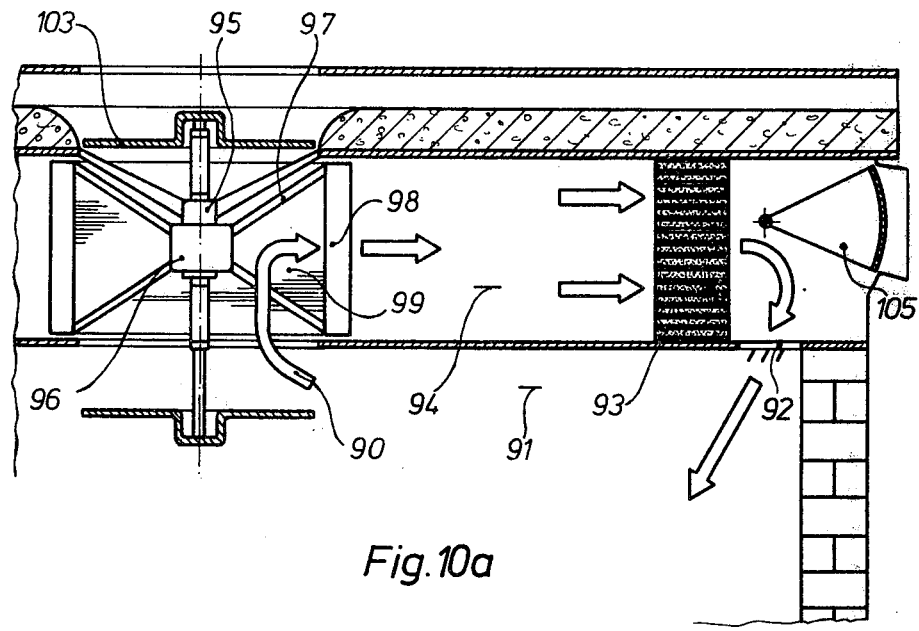

FIG. 10a shows a form of a building which is to be cooled and in which by day the ambient air 90 is conveyed via a radial fan 99, whose vanes 98 are connected via spokes 97 to the external rotors 96 of an electric motor 95, into a chamber 94, the air then passing through the storage battery 93 and returning through the aperture 92 to the interior space 91, the storage device absorbing the excess ambient heat by suitable selection of the storage mass from the point of view of its melting point.

Figure 10B:
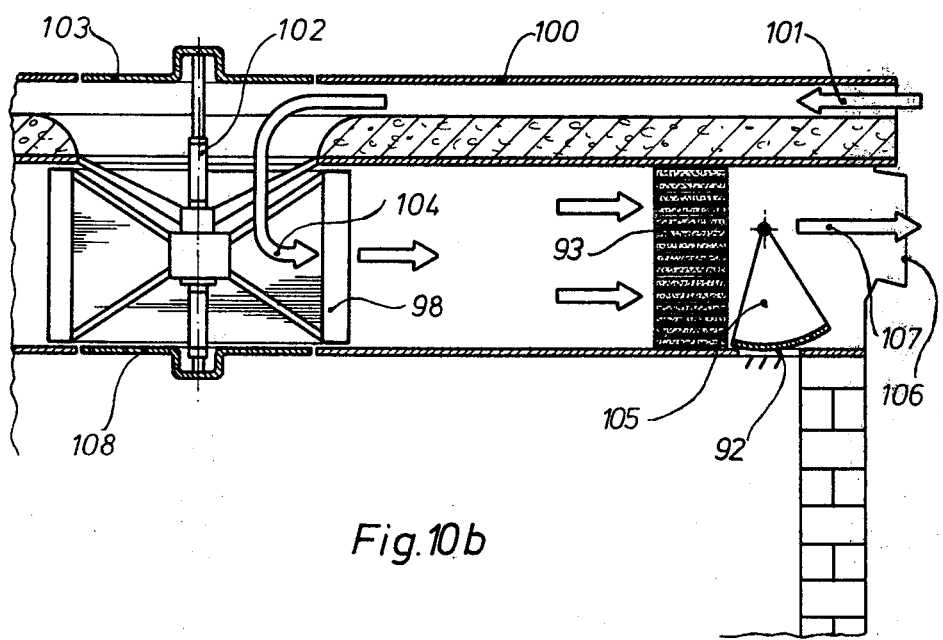

FIG. 10b shows the same installation at nighttime. Below the skin of the roof 100 the cool night air 101 enters and is subjected to further cooling on account of the radiation from the roof skin 100. The hydraulic cylinder 102 has displaced upwardly the cover plate 103, which had previously closed off the blower inlet. The night air thus flows through the vane ring 98 in the direction of the arrow 104 and thereafter results in discharging of the storage battery 93. By night the pivotal flap 105 closes the through-aperture 92 and opens the discharge aperture 106, so that the air 107 which has been warmed as it passes through storage battery 93 can be discharged to the outside. By night the cover plate 108 maintains the inlet to the interior of the space 91 closed. The following day the storage device can again accept the unwanted heat. The same arrangements may also be applied to space heating by phase-displacement of the daily cycle and appropriate selection of the melting point of the heat store.

Figure 11A:
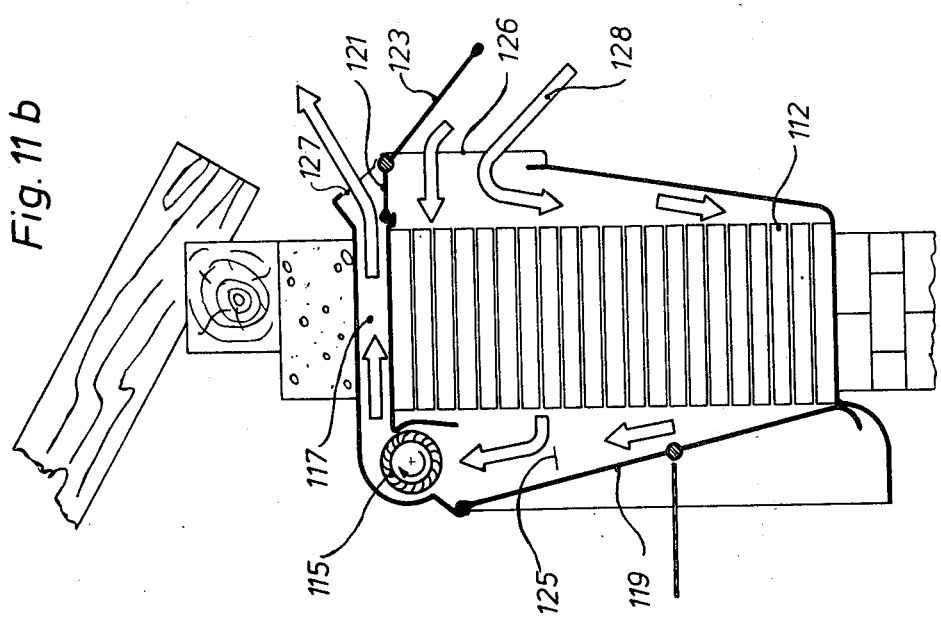

FIG. 11a shows a different arrangement for air conditioning, which is hereinafter described for the case of space cooling.

As in the case of FIG. 9, the storage battery 112 is arranged between the wall 113 and the roof 114 and, if desired, extends over the entire length of the building. A ventilator 115, through which the air flows transversely, sucks up the warm interior ambient air in the direction of the arrow 116. The wall 119 is arranged for pivoting about the pivot 120, and likewise the wall elements 121 and 123 are arranged for pivoting about the pivot 124.

Figure 11B:
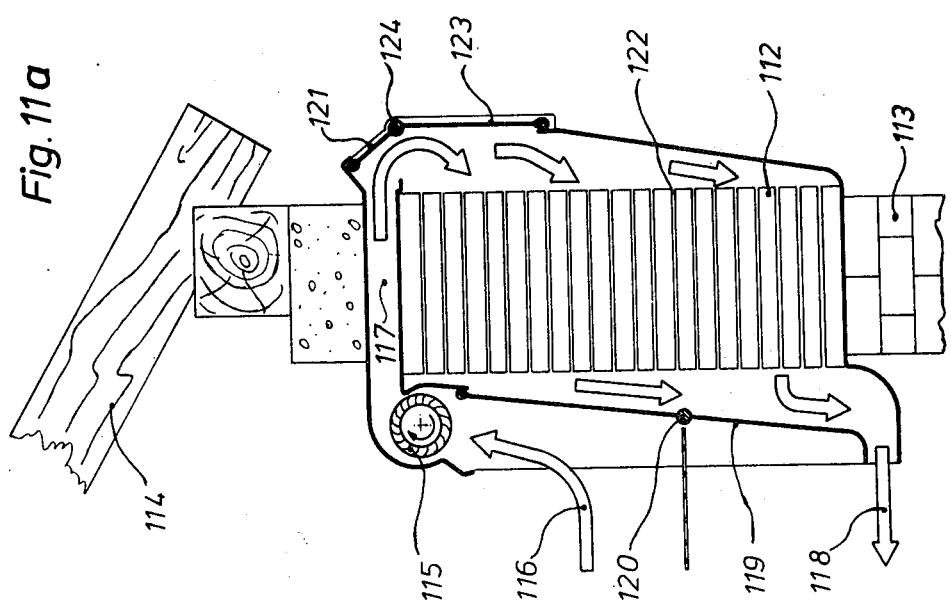

FIG. 11b shows the discharging of the storage device 112 during the night. The wall 119 has now been pivoted in such a way that it bounds a triangular space 125, the wall elements 121/123 being pivoted in the same sense in such a way that a suction inlet aperture 126 is opened up for outside ambient air and a discharge aperture 127 is created. Now external ambient air flows in the direction of the arrow 128 through the storage battery 112, discharges the latter and is, in its warmed condition, blown by the ventilator 115 through the duct 117 and then through the discharge aperture 127, so that the unwanted heat which has been stored in storage device 112 during the day is always discharged during the following night.

The application of the laminar storage device is not limited to the embodiments hereinbefore described.

We claim:

1. A heat storage device for exchanging heat with a current of air, said device comprising a plurality of vertically stacked thin-walled bendable heat storage members in the form of horizontally extending flat level containers, a meltable heat storage mass contained within each said container, and spacing means forming part of a heat exchanger vertically spacing portions of said containers from each other to form horizontally extending air ducts between said containers for the passage of a current of air therethrough.

2. A heat storage device according to claim 1 wherein said spacing means comprises a corrugated insert.

3. A heat storage device for exchanging heat with a current of air, said device comprising a plurality of vertically stacked thin-walled bendable heat storage members in the form of horizontally extending flat, elongate, level containers, a meltable heat storage mass contained within each said container, and horizontal corrugated strips positioned between said containers to vertically space portions of said containers from each other with said strips being of such dimensions that ducts for the passage of air therethrough are formed between said containers and said strips, and where each said strip forms part of a heat exchanger.

4. A heat storage device according to claim 1, wherein said members are stacked one above the other and the lower ones thereof bear the weight of the higher ones.

5. A heat storage device according to claim 3 wherein said strips are wider than said containers and where the strips are mutually spaced by the thickness of one container by means of bridges arranged parallel to the longer sides of said containers.

6. A heat storage device according to claim 5, wherein said bridges together with said strips define conical air ducts.

7. A heat storage device according to claim 1, said device comprising side walls having apertures along vertical margins thereof adapted to be engaged by projections of a supporting device for said heat storage device.

8. A heat storage device according to claim 1, wherein each of said containers comprises a plurality of sections defining a plurality of heat storage chambers arranged downstream of each other in the direction of flow of said current of air therethrough.

9. A heat storage device according to claim 1, wherein a first said member, charged with a first said storage mass is arranged within a second said member, charged with a second said storage mass, said storage masses being at different temperatures.

10. A heat storage device according to claim 8, wherein a first said chamber is charged with a first said storage mass having a first melting point and a second said chamber is charged with a second said storage mass having a second melting point different from the melting point of the said first storage mass.

11. A heat storage device according to claim 1, wherein said storage mass is solidifiable, the arrangement being such that said storage mass is solidified prior to transportation of said device.

12. The combination of a heat storage device according to claim 1 and a fan, said combination being installed in a greenhouse and said fan comprising temperature responsive switch means adapted to be switched "on" when a predetermined ambient air temperature in said greenhouse is exceeded, for the purpose of charging up said heat storage mass, and when said temperature drops to a lower predetermined temperature, for the purpose of discharging heat from said heat storage device.

13. A heat storage device according to claim 1 defining a unitary combination of a heat storage battery comprising a plurality of said heat storage members, at least one ventilation duct, at least one fan and at least one ventilation flap, said at least one duct, at least one fan and at least one flap being in communication for the passage therethrough of ambient air when said flap is in a first position, and said flap being adapted to prevent said passage of air when it is in a second position.

14. A method of space heating a building by solar energy, wherein the ambient air in said building is heated by said solar energy and, by means of the combination of claim 13, any excess heat provided during the day is imposed on said storage device by circulating said ambient air and utilised during the night for heating said ambient air.

15. A method of cooling an enclosed space, wherein, using a device according to claim 13, any excess heat in said space is used to charge said storage device, the so-stored heat being, during the following night, imposed on an air current introduced into said space from outside said space.

16. A method of maintaining the ambient air temperature of an enclosed space constant, wherein, using a heat storage device according to claim 1, air is blown through said space from outside thereof and cooled by said device during the day by giving off heat to, for storage in, said device, and heated during the night by so-stored heat being given off to said air current.

* * * * *

UNITED STATES PATENT AND TRADEMARK OFFICE
CERTIFICATE OF CORRECTION

PATENT NO. : 4,170,261

DATED : October 9, 1979

INVENTOR(S) : NIKOLAUS LAING ET AL.

It is certified that error appears in the above-identified patent and that said Letters Patent are hereby corrected as shown below:

Column 2, lines 20-24 "are provided storage member 3 consisting of a tubular hose-like element having a thin bendable side wall compressing a foil material. These tubular elements are hollow ribs 3 which form ducts 4 between them." should read --are provided each of which comprises a plurality of heat storage members or hollow ribs 3 which form ducts 4 between them.--;

Column 3, lines 6-7 "introduced into the each of which comprises a plurality of heat storage members or as" should read --introduced into the storage member 3 consisting of a tubular hose-like element having a thin bendable side wall comprising a foil material. These tubular elements are--;

Signed and Sealed this

Eleventh Day of December 1979

[SEAL]

Attest:

SIDNEY A. DIAMOND

Attesting Officer

Commissioner of Patents and Trademarks